Oct. 17, 1961 A. A. SUGALSKI ET AL 3,004,671
HIGH TEMPERATURE ANALYTICAL FILTER
Original Filed Feb. 11, 1959
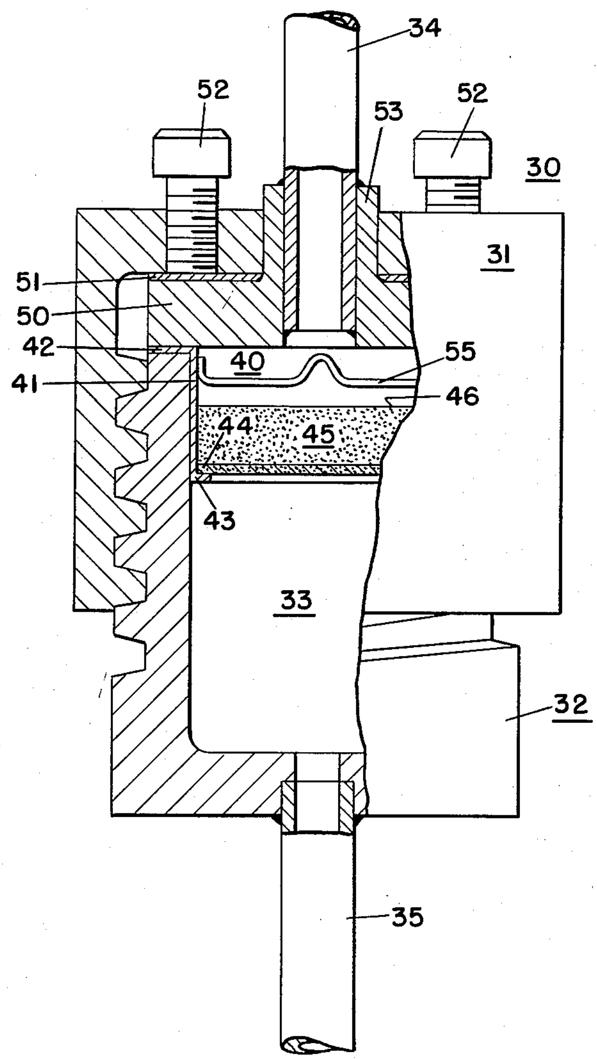
INVENTORS
ALFRED A. SUGALSKI
SHERMAN L. WILLIAMS
WILFRED F. MATHEWSON JR.
BY
J. F. Sheehan
ATTORNEY United States Patent Office 3,004,671

Patented Oct. 17, 1961

3,004,671

HIGH TEMPERATURE ANALYTICAL FILTER

Alfred A. Sugalski, Scotia, Sherman L. Williams, Elnora, and Wilfred F. Mathewson, Jr., Ithaca, N.Y., assignors, by mesne assignments, to the United States of America as represented by the Secretary of the Navy Original application Feb. 11, 1959, Ser. No. 792,680. Divided and this application Feb. 12, 1960, Ser. No. 12,891

1 Claim. (Cl. 210—445)

This invention relates to filtering apparatus and more particularly to analytical filters for use in the quantitative separation of solubles and insolubles from liquids at high temperatures.

The solubility of most materials is greatly affected by temperature and numerous materials require extremely high temperatures to place them in a soluble state. Since analytical determinations of separated materials are conveniently and conventionally performed under atmosphereic conditions it is usually necessary after separation of the solubles from the insolubles under high temperature conditions to cool down the separation vessel before the separated products can be analyzed.

One object of the invention is to provide an apparatus which is adapted for carrying out a filtering operation at high temperatures but which is easily disassembled to permit ready access thereto for examination of the separated products.

Another object is to provide such an apparatus for carrying out filtering operations under pressure.

Another object is to compactly arrange the filtration media within a filtraton chamber in a manner to provide ready accessibility for analysis of the filtered products.

Another object is to provide a high efficiency filtering unit utilizing a precoat material adapted for the quantitative separation of solubles and insolubles.

By the present invention a highly efficient filtering operation may be accomplished by the utilization of a precoat material which permits the quantitative separation of solubles and insolubles under high temperature conditions. The filtering apparatus is so designed that the precoat material is maintained on a support within the filtering apparatus in the path of the filtration liquid passing through the apparatus and the support and precoat material are arranged to be removed readily from the filtering apparatus in order to provide access thereto for examination of the filtered material. Samples of the non-filterable solids content may, of course, be taken downstream of the precoat material for analysis without removal of the precoat and its support.

The particular precoat material to be used for a filtering operation is required to be insoluble and stable in the filtration liquid and at the temperature of the filtering operation and also be capable of permitting the filtration product to be removed either by ashing or being dissolved in another fluid which will not affect the filtration product.

The support for the precoat material is preferably in the form of a porous disc constructed of a material which will introduce little if any of the filtration product or material which is to be measured. The support is also required to be insoluble and stable in the filtration liquid and under the high temperature conditions of the filtration operation and yet it must have a degree of porosity sufficient to pass liquid at the desired rate and pressure drop but insufficient to allow any significant amounts of the precoat material to pass through or become entrapped in the pores of the support, The figure is a view in partial sectional elevation of another form of apparatus.

In the figure the apparatus is generally like that described in connection with FIGS. 1 and 2 of our Patent No. 2,979,207 but differs therefrom in its details of construction. The assembled apparatus is indicated at 30 and is made up of upper and lower sections which, in the figure are indicated by numerals 31 and 32. The upper and lower sections when assembled provide a central compartment 33 through which the liquid passes from the upper inlet 34 to the lower outlet 35. The upper section 31 is internally threaded while the lower section 32 is externally threaded permitting the sections to be readily assembled and disassembled.

A cup-shaped element or sub-assembly indicated at 40 is mounted at the upper end of the compartment 33. The element 40 has a cylindrical vertical side wall 41 which is provided with an outer flange 42 for being received by the upper edge of the lower section 32 and has a lower inner flange 43 for receiving a flat porous disc 44 for supporting the precoat material which is indicated at 45 and may, for example, extend to the level indicated by the line 46.

A gland 50 is mounted on the outer flange 42 of the cup-shaped member 40 while a washer 51 is positioned between the gland and the upper end of section 31 to provide a sealed arrangement for these elements which is maintained by means of pressure bolts 52 which are screw-threadedly mounted in the upper end of section 31. As shown, the gland 50 is provided with a hollow extension 53 which extends through an opening in the upper end of section 31 and receives the inlet conduit 34 and is preferably sealed therewith by welding, as shown, while the outer conduit 35 is welded in sealing engagement with the end of lower section 32 as shown. For convenience in removing the precoat material a bail or handle 55 is secured to the cup-shaped member 40 and permits ready removal of the precoat material and separated products following a filtering operation and after the upper section 31 of the assembly is removed from the lower section 32.

Preferably, the precoat material 45 will consist of a high purity ashable substance such as graphite. This material is known to be suitable for separating corrosion products for analytical determinations of the soluble and insoluble portions in water systems of high temperature steam power plants or cooling systems of nuclear power plants. The apparatus above described is to be fabricated from stainless steel, preferably, but may be made from other materials which suitably resist high temperatures. As an example, if the apparatus is used in the measurement of the solubility of iron and manganese in water, the internal surfaces of the upper and lower sections 31 and 32 and the surfaces of other elements of the apparatus which the solution would contact can be plated with nickel to prevent release of corrosion products.

This application is a division of application Serial No. 792,680, filed February 11, 1959, and issued as Patent No. 2,979,207, April 11, 1961, for High Temperature Analytical Filter.

What is claimed is:

Apparatus for effecting filtering operations which comprises complementary tubular sections each having one open end and a centrally-apertured end wall, said sections having their sidewalls removably secured together in nested relation forming a housing defined by the sidewalls and the centrally-apertured end walls, one section having its open end disposed within the housing and providing a space with the apertured end wall of the other section, said open end of said one section providing a rim of substantial surface extending inwardly from the sidewall of the other section, a cup-shaped container for precoat material having an outwardly extending annular flange at its open end and its other end formed of a porous filter, said container being disposed within said one section and having its outwardly extending annular flange received by the rim of said section, a transverse sealing gland in said space and disposed on said outwardly extending flange of the container, said gland having a conduit extending centrally thereof with one end extending through the centrally-apertured end wall of said other section in sealed relation therewith and its other end communicating with the open end of said container and means carried by said last mentioned end wall for clamping the outwardly extending flange of the cup and the sealing gland in fixed position.

References Cited in the file of this patent

UNITED STATES PATENTS 2,436,077 Robertson ______________ Feb. 17, 1948